United States Patent
Richard et al.

(10) Patent No.: US 12,117,963 B2
(45) Date of Patent: *Oct. 15, 2024

(54) SYSTEM AND METHOD FOR EFFICIENT MULTI-STAGE QUERYING OF ARCHIVED DATA

(71) Applicant: Open Text Holdings, Inc., San Mateo, CA (US)

(72) Inventors: Damien Laurent Richard, Montreuil (FR); Markus Theodorus Hendrikus Polman, Rotterdam (NL); Conrado Eduardo Poole Siguero, San Francisco, CA (US); Andreas Kalogeropoulos, Vincennes (FR)

(73) Assignee: Open Text Holdings, Inc., Menlo Park, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/497,697

(22) Filed: Oct. 8, 2021

(65) Prior Publication Data
US 2023/0109804 A1 Apr. 13, 2023

(51) Int. Cl.
*G06F 16/11* (2019.01)
*G06F 16/14* (2019.01)
*G06F 16/172* (2019.01)

(52) U.S. Cl.
CPC .......... *G06F 16/113* (2019.01); *G06F 16/148* (2019.01); *G06F 16/172* (2019.01)

(58) Field of Classification Search
CPC ..... G06F 16/113; G06F 16/148; G06F 16/172
See application file for complete search history.

(56) References Cited

U.S. PATENT DOCUMENTS

| 5,799,184 A | 8/1998 | Fulton et al. |
| 8,972,405 B1 * | 3/2015 | Chaulk ................. G06F 16/182 |
| | | 707/808 |

(Continued)

FOREIGN PATENT DOCUMENTS

| CN | 104516979 | 4/2015 |
| CN | 110990362 | 4/2020 |

OTHER PUBLICATIONS

Office Action for U.S. Appl. No. 17/497,694, mailed Mar. 13, 2023, 12 pgs.

(Continued)

*Primary Examiner* — Matthew J Ellis
(74) *Attorney, Agent, or Firm* — Sprinkle IP Law Group

(57) ABSTRACT

A method for searching indexed packages, generating indexed packages for the records of data based on a parameter, each indexed package characterized by a package key, generating metadata for the indexed packages, the metadata comprising the package key and a reference to the packaged records of data based on a value of the parameter, storing the indexed packages and querying the records of data based on a query defining a search value of the parameter. Querying the records comprises searching the metadata based on the search value and identifying a package key for the metadata referencing the search value of the parameter, loading, from a file-based cache, an indexed package based on the identified package key, when the indexed package is stored in the cache, and loading, from the data repository which is an archive storage, the indexed package when the indexed package is not stored in the cache.

17 Claims, 7 Drawing Sheets

(56) References Cited

U.S. PATENT DOCUMENTS

| | | |
|---|---|---|
| 10,719,554 B1* | 7/2020 | Davis .................. G06F 16/901 |
| 12,019,583 B2 | 6/2024 | Richard et al. |
| 2008/0263023 A1 | 10/2008 | Vailaya et al. |
| 2011/0258383 A1 | 10/2011 | Niemela et al. |
| 2013/0246375 A1* | 9/2013 | Prakoso .................. G06F 16/22 707/693 |
| 2015/0100553 A1 | 4/2015 | Fabijancic et al. |
| 2015/0199367 A1* | 7/2015 | Hammer ............. G06F 16/1748 707/654 |
| 2016/0117322 A1* | 4/2016 | Ramaswamy ........ G06F 16/951 707/756 |
| 2016/0253247 A1 | 9/2016 | Huang |
| 2016/0283474 A1* | 9/2016 | Patterson ............. G06F 16/313 |
| 2016/0299818 A1* | 10/2016 | Vijayan ............... G06F 16/1748 |
| 2017/0004323 A1 | 1/2017 | Balachandran et al. |
| 2018/0046728 A1 | 2/2018 | Iljazi |
| 2019/0220538 A1 | 7/2019 | Rese |
| 2020/0311151 A1 | 10/2020 | Menon et al. |
| 2020/0320050 A1* | 10/2020 | Mishra .................. G06F 16/252 |
| 2021/0026982 A1* | 1/2021 | Amarendran ....... G06F 21/6254 |
| 2021/0034571 A1* | 2/2021 | Bedadala .............. G06F 16/134 |
| 2023/0114912 A1 | 4/2023 | Richard |

OTHER PUBLICATIONS

International Search Report and Written Opinion issued by the U.S. Patent and Trademark Office (USPTO) as the International Searching Authority (US/ISA) for International Application No. PCT/US2022/46104, maled May May 30, 2023, 10 pages.

Notice of Allowance issued for U.S. Appl. No. 17/497,694, mailed Sep. 28, 2023, 9 pages.

Notice of Allowance issued for U.S. Appl. No. 17/497,694, mailed Jan. 31, 2024, 8 pages.

International Preliminary Report on Patentability issued by the International Bureau of WIPO for International Application No. PCT/US2022/46104, mailed Apr. 18, 2024, 7 pages.

* cited by examiner

SYSTEM AND METHOD FOR EFFICIENT MULTI-STAGE QUERYING OF ARCHIVED DATA

TECHNICAL FIELD

This disclosure relates generally to the field of searching for archived data. Specifically, the disclosure relates to a system and method for efficient multi-stage querying of archived data.

BACKGROUND

Organizations are increasingly archiving electronic data in long term storage archives. In some cases, however, it may be necessary to search for archived data. Some solutions rely on a database that indexes all the records in an archive. However, as the volume of data in an archive grows, the search time for queries increases even if the newly added data does not contain records relevant to a query. Some prior solutions utilize databases keeping all archived data and its indexes online—that is, ready to be used in a synchronous way, thus leading to large indexes as the volume of archived data grows. This can be disadvantageous because it requires keeping the data and indexes in higher-tier storage when much of the information may only be searched infrequently.

Therefore, improved mechanisms for querying archived data are desired.

SUMMARY

Embodiments described herein provide systems and methods for multi-stage querying of archived data.

Embodiments described herein include a relational database storing package keys for a plurality of data packages. The package keys store values for a partitioning parameter. The values for the partitioning parameter may be stored, for example, as a single value, as list, as a range, or according to another format. Each of the plurality of data packages corresponds to a different package key. For example, each of the packages may correspond to a different subset of the values for the partitioning parameter. Embodiments also include a filesystem for storing index files of the data packages. In some embodiments, the filesystem is embodied on a local memory.

When a system receives a search query for records in the packages, the system searches the relational database using a subset of the search criteria to identify packages according to the package keys. For each of the packages identified, the system determines if an index file for the data package is on the filesystem. The index file for a data package comprises an index of the records in the package. If the index file for a package is not on the filesystem, the system restores the index file from storage (e.g., an external storage). The system uses the index files to search the packages for records meeting the search criteria and returns the records meeting the search criteria.

In various embodiments, the index files include search indexes and stored records. The index files may be cached in the filesystem for use by a search engine. In even more particular embodiments, the index files may be a Lucene index for use by a Lucene-based search engine.

In some embodiments, if the index file of an identified package is not cached in filesystem, performing a multi-stage search comprises retrieving the index file for the package from an external storage, caching the index file into the filesystem, updating the relational database to indicate that the package is online, and searching and returning records matching the search criteria using the index.

In some embodiments, using the index to search the package for records meeting the search criteria comprises performing a synchronous search. In other embodiments, using the index to search for records meeting the search criteria comprises performing an asynchronous search. In a synchronous search, the data to be searched is ready to be accessed for searching (i.e., is in the storage used for searching), compared to an "asynchronous search" in which data needs to be moved from storage that is typically slower and cheaper than the storage used for synchronous searching—for example, archival storage or other storage that is slower and cheaper compared to the storage used for the synchronous searches.

Some embodiments can include ingesting records as packages, generating the package keys, and storing the package keys in the relational database. The index files and packages may be ingested in parallel in some implementations.

One embodiment of a method for searching indexed packages comprises ingesting records as packages. Ingesting the records may include indexing the records of data based on a parameter and generating indexed packages for the records of data based on the parameter, each index package characterized by a package key, and generating metadata for the indexed packages, the metadata comprising the package key and a reference to the packaged records of data based on a value of the parameter. According to one embodiment, the metadata is stored in a relational database. Embodiments may further include storing the indexed packages in a data repository. Still further, one embodiment includes querying the records of data based on a query defining a search value of the parameter, searching the metadata based on the search value of the parameter, and identifying a package key for the metadata referencing the search value of the parameter. The method may further include loading, from a cache, an indexed package based on the identified package key, when the indexed package is stored in the cache and loading, from the data repository, which is an archive storage, the indexed package when the indexed package is not stored in the cache. In some embodiments, the cache is a file-based cached. The archive storage may provide data replication in some embodiments.

According to one embodiment, the parameter is characterized by a range of values, each of the generated indexed packages corresponds to one of a plurality of subsets of the range of values, and the search value may be defined within one of the subsets.

According to one embodiment, the parameter is characterized by a plurality of categories, each of the generated indexed packages corresponds to one of the categories, and the search value corresponds to one of the categories.

According to one embodiment, the cache is memory which permits loading of the indexed packages and the records of data therewithin faster than the archive storage.

According to one embodiment, the indexed packages are loaded synchronously from the cache and asynchronously from the archive storage.

Embodiments provide advantages over prior systems for searching archived records. As one such advantage, by filtering out packages that do not contain records of interest in a first stage of the multi-stage querying, the search time for a query is less sensitive to new data that is not relevant to the query.

Further, embodiments provide an advantage, by allowing the search system to minimize or reduce the amount of archived data that must be replicated in faster and often more expensive storage tier, freeing that storage for other purposes.

Furthermore, embodiments allow data partitions to be taken offline and then be brought back online at low cost without re-ingesting and re-indexing that partitions in the relational database.

As another advantage, the index files can be restored at any location having a suitable filesystem and searches can be executed using the index files without impacting synchronous searches. Further, high-availability and disaster recovery may simply involve synchronizing files to the filesystem rather than replicating the entire database.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
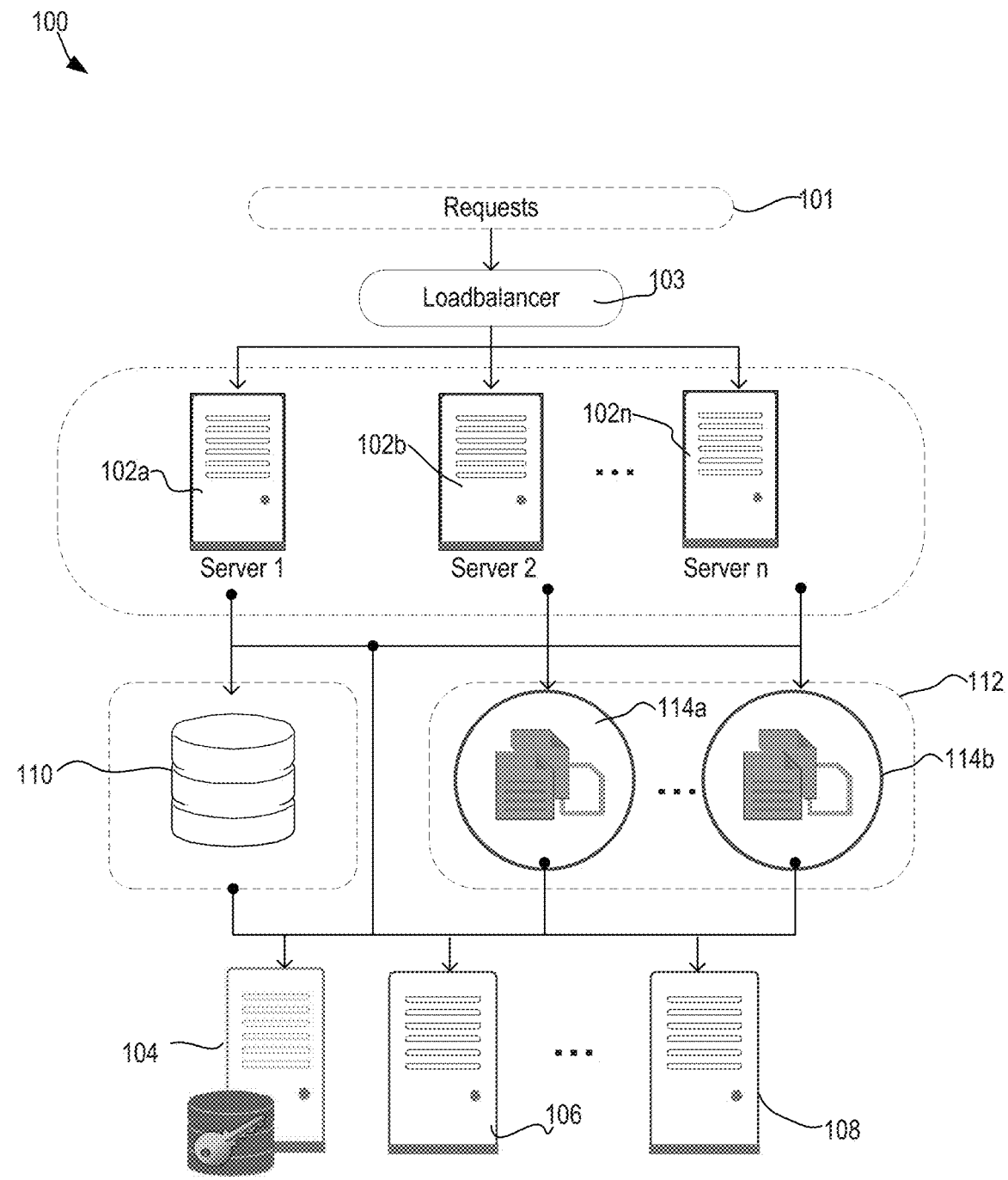
FIG. 1 is a diagrammatic representation of one embodiment of a data archiving system.

FIG. 1 is a diagrammatic representation of one embodiment of a data archiving system 100 for archiving data. Data archiving system provides an interface 101, such as a ReST interface, to receive requests from clients, such as end-user portals or applications, to archive data or search data. A load balancer 103 may distribute the requests to archive servers (e.g., server 102a, server 102b . . . server 102n). According to one embodiment, archive servers are stateless servers. The archive servers archive data to and search data stored in various archive storage systems (archive storage system 104, archive storage system 106, archive storage system 108). The archive storage systems may provide an object store in which objects comprise both metadata stored in a database and associated files in a filesystem. In some embodiments, the archive storage systems provide deep storage. The archive storage systems may provide features such as data replication, high availability, retention policies, data protection and other features.

Data to be archived may be ingested as packages. A package may comprise multiple data files that are held as a logically packaged entity. The archive servers can thus archive the packages to archive storage. Each package may be an archival information package (AIP) that contains archival information units (AIU). As will be appreciated, an AIP contains both metadata that describes the structure and content of archived (or to be archived) information and the actual information itself. According to some embodiments, each package may be an AIP according to the International Standards Organization Open Archival Information System (OAIS) reference model.

The archive servers utilize a system data store 110 that stores system data, including package keys that can be used to filter out packages that will not contain AIUs responsive to a search. The archive servers may also cache package data (e.g., package data 114a and package data 114b) in a package data store 112. The cached package data for an archived package may comprise, for example, an index of record metadata and record metadata from an archived package. The index and record metadata may include, for example, business data from ingested records. Various rules may be implemented to expunge package data from package data store 112, such as least recently used, the least frequently used, first-in-first-out (FIFO), or other rules.

In one embodiment, system data store 110 is a relational database provided by a relational database management system (RDBMS) running on one or more database nodes. Preferably, the RDBMS is running on an archive server utilizing the RDBMS, on a local network with the archive server or at another location that is relatively quickly accessible by the archive server. Package data store 112 comprises storage from which an archive server can access the package data more quickly than accessing the package data from an archive storage system. In one embodiment, package data store 112 is a filesystem on local storage of the archive server or at another location that is quickly accessible by a search engine of the archive server.

The archive servers implement multistage search of archived records. In the first stage, the archive server uses the system data to identify the packages that potentially contain records meeting the search criteria. In the second stage, the archive server searches within the package data of the package using the package data stored in package data store 112. More particularly, when a query containing search criteria is received, the archive server searches the package keys using a portion of the search criteria to identify the packages that potentially hold records meeting the search criteria. This stage filters out packages that are known not to contain responsive records. If the package data for an identified package is in the package data store 112, the archive server searches within the package data of the identified package to identify records that meet the search criteria. If the package data for identified package is not in the package data store 112, the archive server requests the package data from the appropriate archive storage system, caches the package data in package data store 112 and executes the search on the package data. By filtering out packages that do not contain responsive records in the first stage, the search time is not influenced or is only minimally influenced by the volume of archived data for a query having an identical search range.

Figure 2:
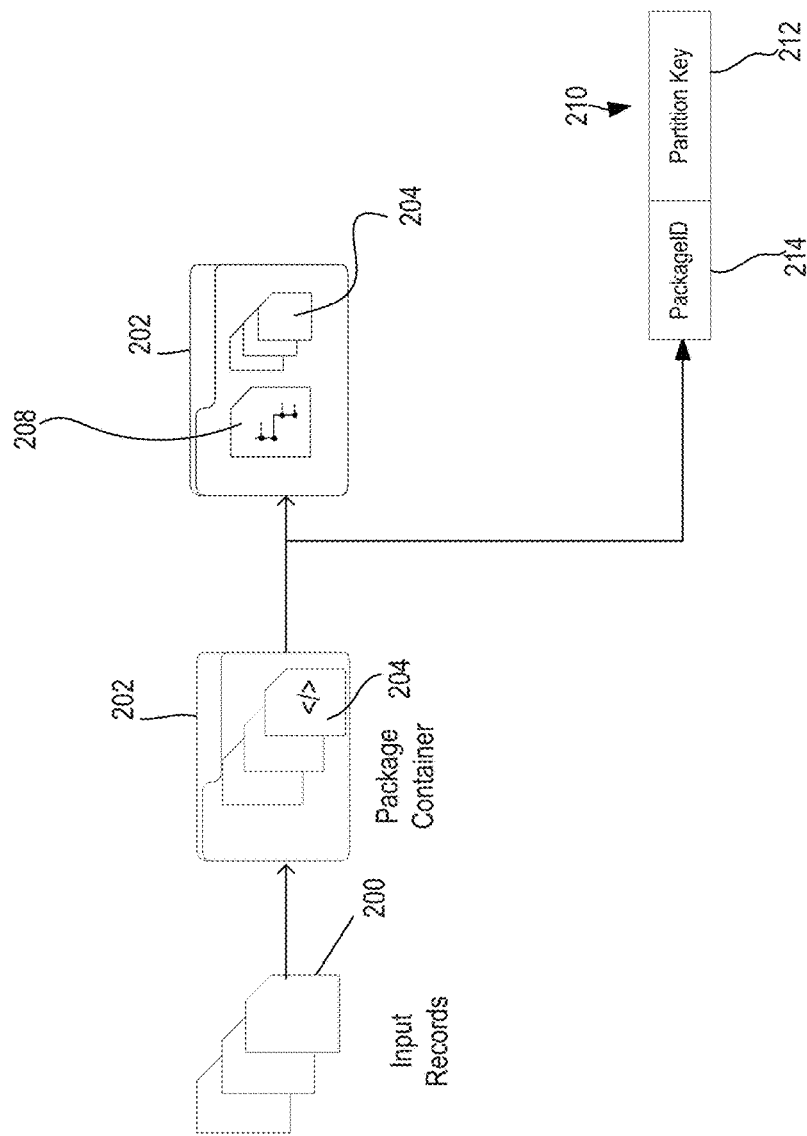
FIG. 2 illustrates one embodiment of ingesting records.

Turning to FIG. 2, as discussed above, data to be archived can be ingested in packages. More particularly, a batch records to be ingested 200, which may include thousands or millions of records, are ingested as a package 202 that contains record metadata 204 of the records as structured data containing one or more parameters for each record. Using the example of call records from a call center, the record metadata 204 of an audio transcript record may include, for example, a CallStartDate field containing a call start timestamp, a CallEndDate field contain a call end timestamp, a CallAgent field containing the name or id of the call center agent who handled the call, a CallCustomer field containing the name or id of the customer who made the call, a CallTranscript field pointing to a file containing a transcript of the of the call, and a CallRecording field pointing to an audio file containing a recording of the call. As can be seen from this example, in some cases, the record metadata may point to an unstructured file, such as a transcript file or audio recording. The record metadata 204 may be embodied as one or more files (e.g., one or more XML files) or according to another format.

Further, one or more parameters from record metadata 204 of the package can be indexed to generate a package index 208, which may be stored as part of the package to create an indexed package. According to one embodiment, the index is embodied as a file. In some embodiments, the index file 208 for a package includes both a search index and stored records of the package. In an even more particular embodiment, the index file 208 for each package is a Lucene index file that indexes all or a portion of metadata 204 (Lucene is an open-source search engine software library supported by The Apache Software Foundation of Wilmington, Delaware) (all trademarks used herein remain the property of their respective owners).

In general, each package (e.g., package 202) may be self-describing in that it contains metadata that describes the structure and content of the records in the package and does not link to other packages. Packages and index files may be ingested in parallel.

During ingestion, or at another time, a set of package metadata 210 may be generated for each package 202. The package metadata 210 includes a package key 212 associated with a package identifier 214. The package key 212 for package 202 includes partition data that characterizes the package 202 based on a partitioning parameter. Preferably, the partitioning parameter corresponds to a parameter indexed in index 208 or another parameter from metadata 204, though other parameters may be used.

According to one embodiment, the partitioning parameter is characterized by a range of values and each of a set of indexed packages corresponds to one of a plurality of subsets of the range of values. Using the example of call records for a call center in which call records are ingested on a monthly basis, the partitioning parameter may be the call start date and thus, the partitioning parameter may be characterized by a range of call dates, with each indexed package of call records corresponding to a subset of the range of call dates. In one such embodiment, package key 212 for indexed package 202 may specify a minimum call date and a maximum call date for the package, where all the records in package 202 fall between the minimum call date and the maximum call date.

In other embodiments, the partitioning parameter is characterized by a plurality of categories or other entities and each partitioning parameter is characterized by a plurality of categories or entities and each of the generated indexed packages corresponds to a subset of the categories or entities. For example, call records may be partitioned into packages based on the agents who handled the call and the package key 212 for package 202 may include a list of one or more agents from the call records in package 202.

Figure 3:
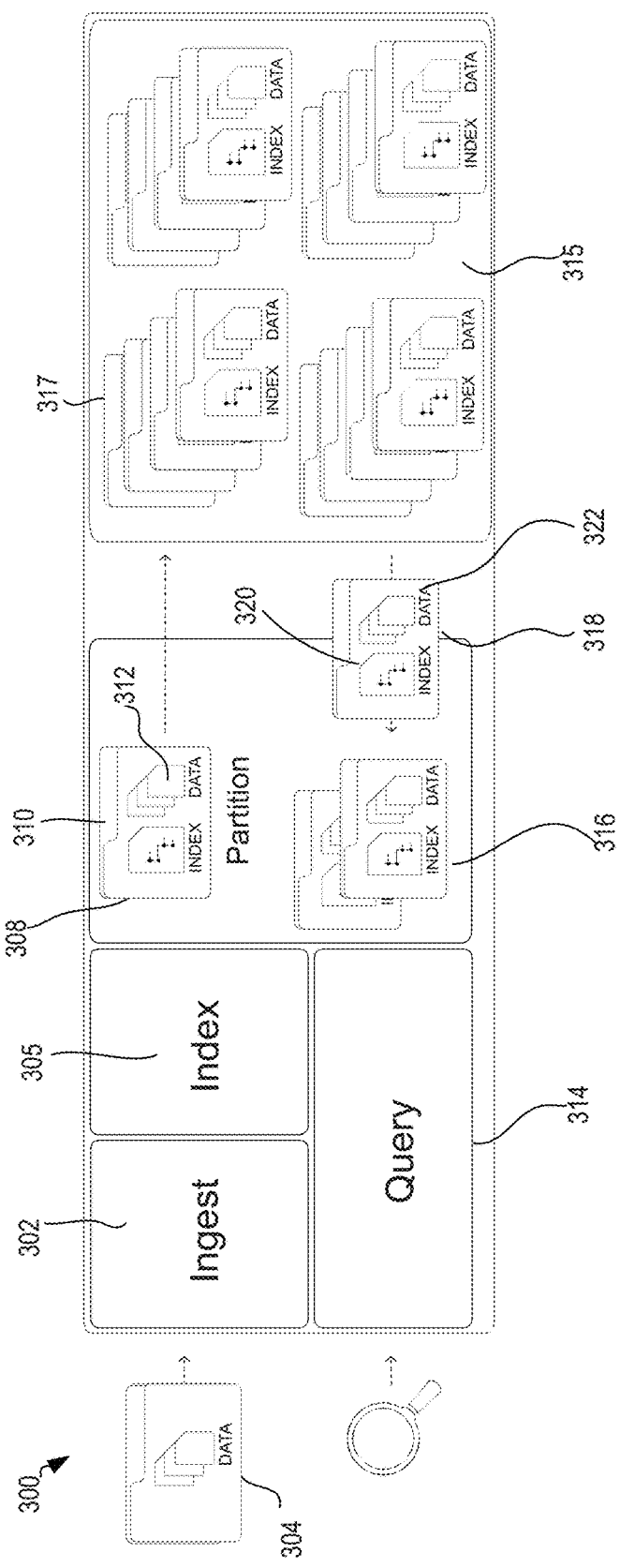
FIG. 3 is a block diagram illustrating an ingest path and a search path for one embodiment of an archiving system.

FIG. 3 is a block diagram illustrating an ingest path and a search path for one embodiment of a data archiving system 300, which may be an example of data archiving system 100. Ingestion logic 302 can ingest records as a package 304 that contains, for example, record metadata and unstructured data files. An indexer 305 may generate an index of the records in package 304 to produce indexed package 308 that includes index 310 and records data 312. The records data 312 may include metadata and unstructured data of the package. As discussed above, the index 310 and metadata may be embodied as files, in some embodiments. In some embodiments, the index 310 for a package is embodied as an index file that includes both a search index and stored records of the package. In addition, partition metadata, including a package key, is generated for the package, and stored in a database (not shown). The indexed package 308 is stored to archive 317 in archival storage 315.

Turning to the search path, query logic 314 (e.g., a search engine) receives a search query containing search criteria, including a search value for the partitioning parameter. The query logic 314 searches the package keys based on the search value for the partitioning parameter to identify indexed packages that potentially contain records responsive to the search criteria, and thus filter out packages that are known not to contain records responsive to the query. If a package is identified, the query logic determines if the package data for the package is cached in package data store 316. If the package data for the package is not cached in package data store 316, query logic 314 requests the package data (e.g., package data 318) from archival storage and caches the package data. According to one embodiment, package data 318 includes the index 320 and record metadata 322 from the package, but unstructured data files of the package remain in archival storage. In one embodiment, the index 320 and stored records are embodied as an index file. Once package data 318 is in package data store 316, the package can be searched using index 320 for responsive records. Query logic 314 returns metadata of the responsive records meeting the search criteria to the requestor.

Figure 4:
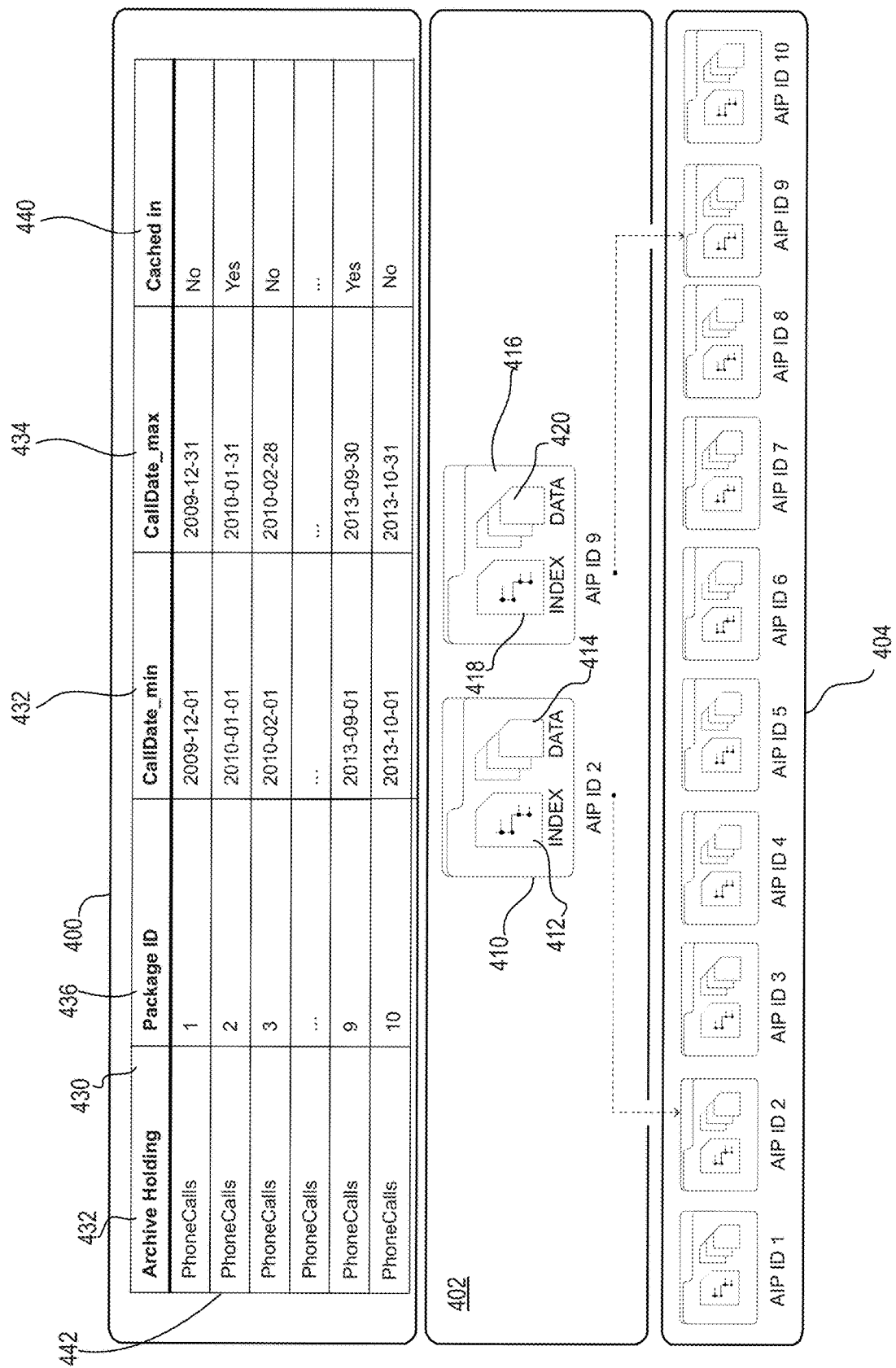
FIG. 4 is a diagrammatic representation of an example of data stored by one embodiment of a data archiving system.

FIG. 4 is a diagrammatic representation of an example of data stored by one embodiment of a data archiving system (e.g., data archiving system 100, data archiving system 300). In the embodiment illustrated, the data archiving system includes a system data store 400, a package data store 402, and an archive data storage 404. In one embodiment, system data store 400 is a relational database provided by a relational database management system (RDBMS) running on one or more database nodes. Preferably, the RDBMS is running on an archive server utilizing the RDBMS, on a local network with the archive server or at another location that is relatively quickly accessible by the archive server. Package data store 402 comprises storage from which an archive server can access index files more quickly than accessing the index from an archive storage system. In one embodiment, package data store 402 is a filesystem on local storage of the archive server or at another location that is quickly accessible by the archive server. Package data store 402 may be used to store index files of data packages in some embodiments. Archive data storage 404 may provide generally slower and cheaper storage for long term storage.

Archive data store 404 may provide features such as data replication, high availability, retention policies, data protection and other features. Archive data store 404 may include multiple archives, each containing a plurality of packages (e.g., AIPs). In this example, archive data store 404 includes a PhoneCalls Archive that contains Packages 1-10.

In the example of FIG. 4, a PhoneCall archive stores packages of call records from a call center. The packages are ingested on a monthly basis such that each package contains records having a CallStartDate within a specific month. In this example, the partitioning parameter is call date, which may correspond to the CallStartDate parameter of Packages 1-10, and which is characterized by a range of date values, with each of the Packages 1-10 corresponding to a particular subset of the range. Further each archived package includes an index and metadata of the call records. In this example, the index of each package indexes at least a call date parameter and a call agent parameter of the package metadata. An archived package may also include unstructured data, such as transcript files or voice recording files.

In the example of FIG. 4, system data store 400 includes package keys. As discussed above, the package keys may include partition data generated during ingest of the packages associated with a package identifier. In this example, the package key for each archived package is based on a call date parameter and includes a CallDate min value (column 432) and a CallDate max value (column 434) associated with a package identifier (column 436). The package metadata stored for each indexed package may include other information that can be used to locate a package. For example, column 432 indicates the archive holding the package and column 440 indicates whether the package data of the package has been cached in package data store 402. This can indicate that the package is online. If, as another example, the records were partitioned by call agent, the package key for each package may include a list of all the call agents associated with the records in the package.

Package data store 402 holds cached package data and, more particularly, cached index files. In the illustrated example, package data 410 of Package 2 and package data 416 of Package 9 are cached in package data store 402. Package data 410 includes the index 412 and record metadata 414 from Package 2 and package data 416 includes the index 418 and record metadata 420 from Package 9. The index and metadata of a package may be stored in files usable by a search engine. In a particular embodiment, the index and metadata of a package may be embodied as an index file and stored in a filesystem of package data store 402 for use by a search engine. In a more particular embodiment, the package data may be stored as a Lucene index file that includes the index of records in a package and the stored records (e.g., the record metadata stored as XML) usable by a Lucene search engine. Depending on implementation, the package data stored in package data store 402 may or may not include unstructured files of the package.

The data archiving system can implement a multi-stage search. Say a search query is received to look for the phone call information of the call agent "Maria" on "Jan. 14, 2010," the data archiving system first uses the package keys to locate packages that potentially contain records of interest and then uses cached package data to search within those packages. For example, the data archiving system uses the call date value of Jan. 14, 2010, to search the package keys for a matching package key. Here, the data archiving system will identify record 442 for Package 2. Record 442, in this example, indicates that the package data 410 for Package 2 is cached in package data store 402. As such, the archive server can search within the package for calls having the CallDate of Jan. 14, 2010, and the CallAgent "Maria" using index 412 and return the records responsive to the search (e.g., return the record metadata 414 for the responsive records). In the example, the search can be considered synchronous because the index 412 is already in the storage used for searching and did not have to be moved to that storage from another storage for the search to take place.

If the package record 442 had indicated that package data 410 for Package 2 was not in package data store 402, the archive server would request package data 410 from the PhoneCalls archive in archive data storage 404 and copy the package data 410 to package data store 402. Thus, the archive server may, in one embodiment, restore the index file to the filesystem from an external storage. Further the archive server can search the package using index 412. In this case, the search package data 410 is asynchronous because the data to be accessed must be moved (e.g., copied) from the archive data storage 404 to the package data store 402 (the data store used for synchronous searches) for the search to be performed.

Figure 5:
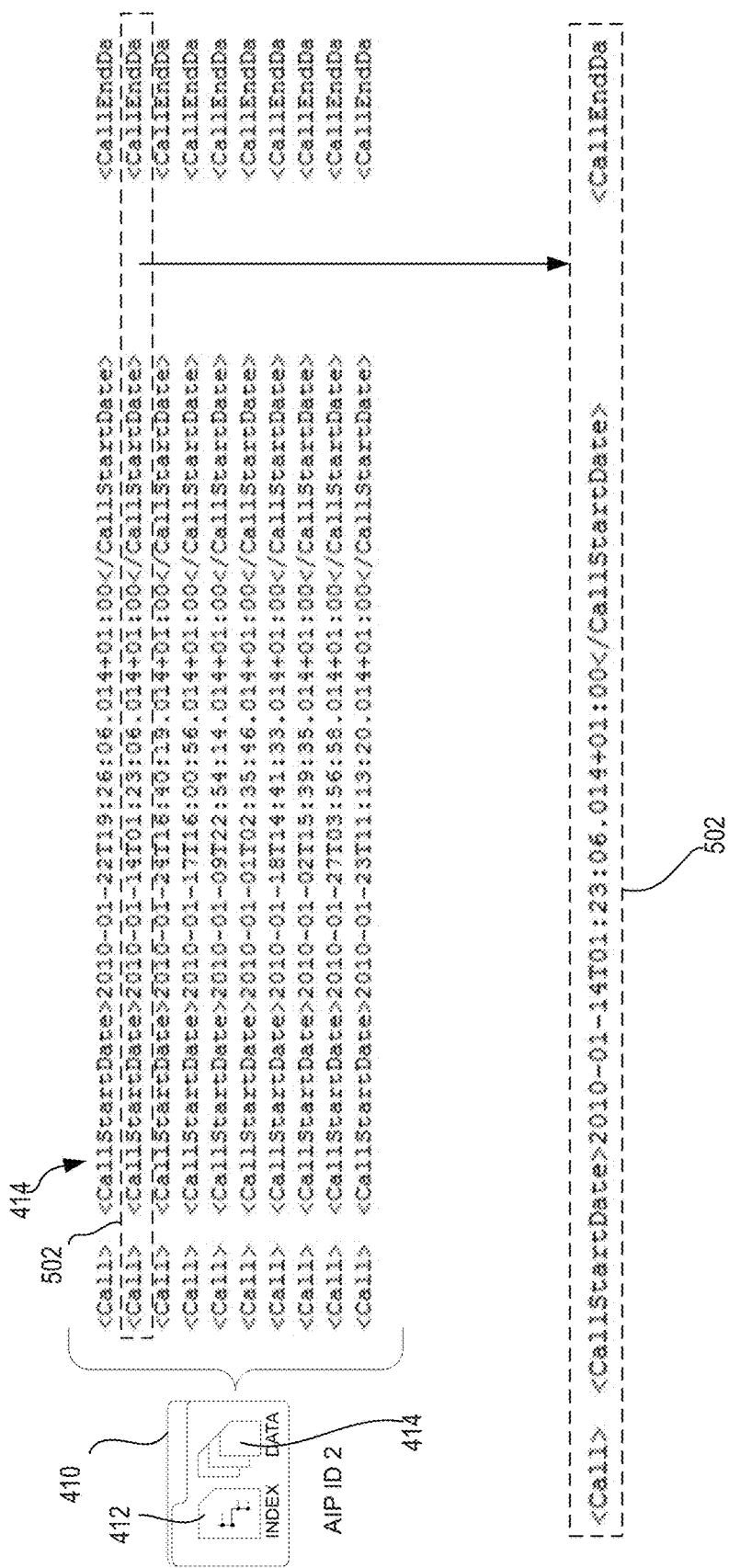
FIG. 5 is a diagrammatic representation of one embodiment of searching within a package.

Turning to FIG. 5, one embodiment of searching within a package using package data 410 is illustrated. Here, Package 2 may be identified by searching package keys as discussed above. The index 412 within package data 410 for Package 2—for example, within an index file for Package 2—indexes records based on the metadata parameters CallStartDate, CallEndDate and CallAgent (only CallStartDate is illustrated) from metadata 414. Again, using the example of a search having the CallDate of Jan. 14, 2010, and the CallAgent "Maria," the archive server may identify record 502 from the index and return the record metadata responsive to the query.

Figure 6:
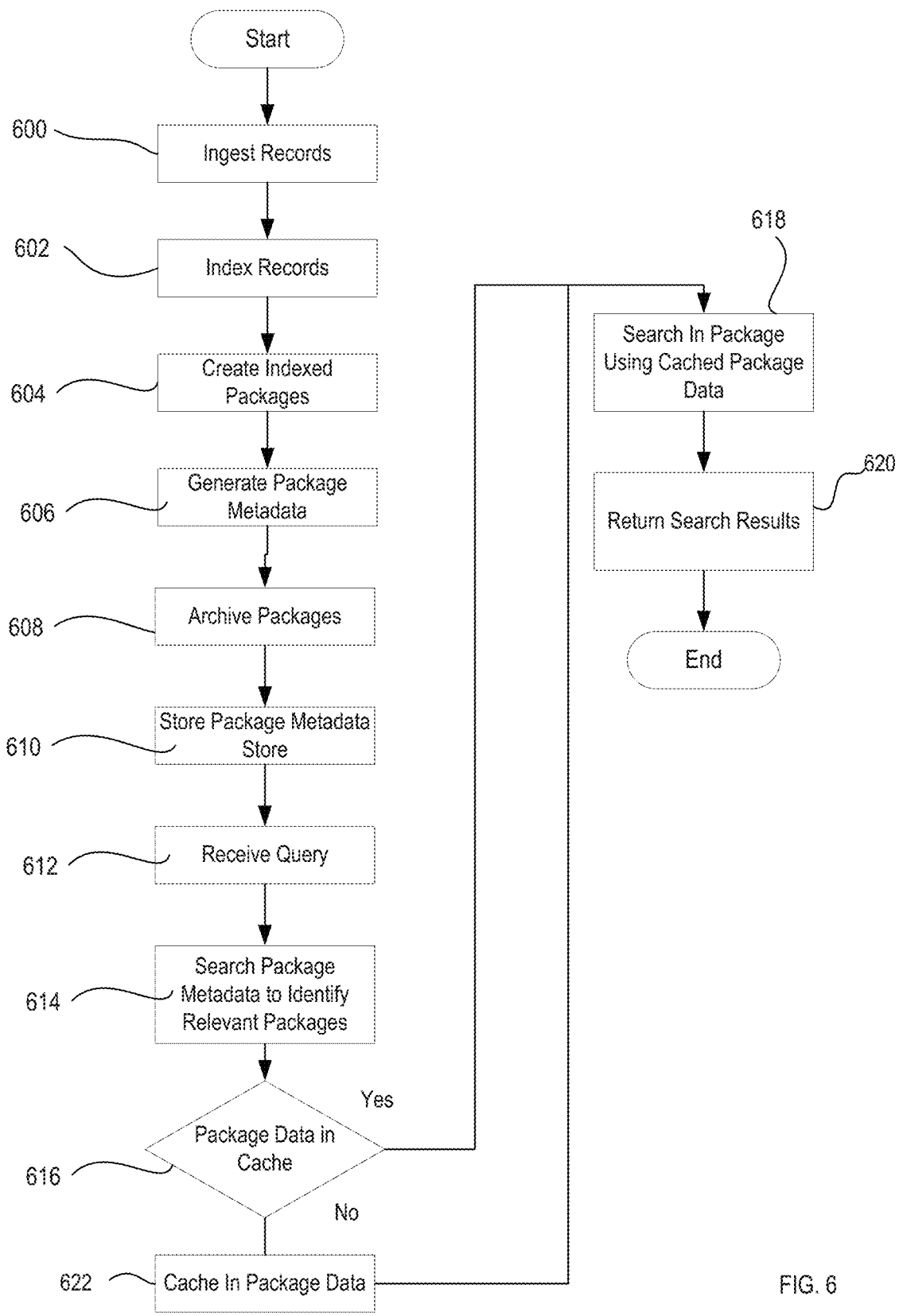
FIG. 6 is a flow chart illustrating one embodiment of a method for archiving data and querying archived data.

FIG. 6 is a flow chart illustrating one embodiment of a method for archiving data and querying archived data. In various embodiments, the method of FIG. 6 may be implemented by a data archiving system, such as data archiving system 100 or data archiving system 300. Even more particularly, in some embodiments, the method of FIG. 6 may be implemented by a server (e.g., archive server 102*a*, archive server 102*b*, archive server 102*n*) of a data archiving system. Further, in some embodiments, the method of FIG. 6 may be embodied as computer executable instructions on a non-transitory, computer-readable medium.

At step 600, the data archiving system ingests records as packages (e.g., AIPs). The packages may be ingested in parallel, in series over time, or a combination thereof. The packages may contain record metadata for records and unstructured data. The packages may be self-describing.

If not already indexed, the data archiving system can index the records of each package (step 602). More particularly, the data archiving system indexes the record metadata of each package according to one or more parameters. Thus, the data archiving system may generate indexed packages (step 604) with each indexed package containing an index and record metadata. According to one embodiment, the index and record metadata of a package are embodied as an index file. The indexed packages may also include unstructured data.

The data archiving system further generates package metadata for each indexed package (step 606). The metadata for each indexed package may include a package key and a reference to the package. In one embodiment, the package key is based on a partitioning parameter and includes a range of values, a list of values, or other data structure indicating values for the parameter that correspond to the package.

The data archiving system stores the indexed packages in archival storage (step 608). Further, the data archiving system stores the package metadata in a package metadata store (step 610). In one embodiment, the data archiving system stores the package metadata in a relational database. The data archiving system may store the archive to which each package was stored as part of the package metadata.

The data archiving system receives a search query for archived records (step 612), the search query containing search values. The data archiving system may implement a multi-stage search to locate responsive records. The data archiving system identifies a package by searching the package metadata using the search value to identify a package key (step 614).

For an identified package, the data archiving system determines if the package data for the package is in a package data store (step 616). For example, the data archiving system determines if the index file for a package is stored in the filesystem that acts as a package data store. If the package data is cached in the package data store, the data archiving system searches for records in the package using index from the package data cached in the package data store to identify responsive records (step 618). For example, the data archiving system searches the index of an index file for the package to determine records in the package meeting the search criteria. The data archiving system returns the records meeting the search criteria. For example, the data archiving system returns the metadata of the records that meet the search criteria to the requestor (620). In some embodiments, the search of step 618 may be performed synchronously with respect to the request received at step 612 because the package data may already be cached locally in the filesystem.

Returning to step 616, if the package data for an identified package is not cached in the package data store—for example, if the index file for an identified package is not in the filesystem used as a package data store, the data archiving system can retrieve the package data for the package from external storage (e.g., the archive storage) and cache the package data at the package data store (step 622). In one embodiment, the data archiving system restores the index file for the data package from the eternal storage. The metadata for the package may be updated to indicate its cached status. If the package data must be cached-in based on a search request, the data archiving system may perform step 616 with respect to the package data asynchronously to the request in some embodiments.

Additional steps may also be performed. For example, rules may be applied to determine when to delete the package data for a package from the package data store (i.e., to cache out the data). Examples of cache out rules include, but are not limited to, least recently used, least frequently used, and FIFO. When the package data for a package is deleted from the package data store, the metadata in the database may be updated to reflect that the package data is no longer cached.

FIG. 6 is merely an illustrative example, and the disclosed subject matter is not limited to the ordering of or number of steps illustrated. Embodiments may implement additional steps or alternative steps, omit steps, or repeat steps. For example, steps 616-620 may be performed for each package identified from searching the package metadata.

Figure 7:
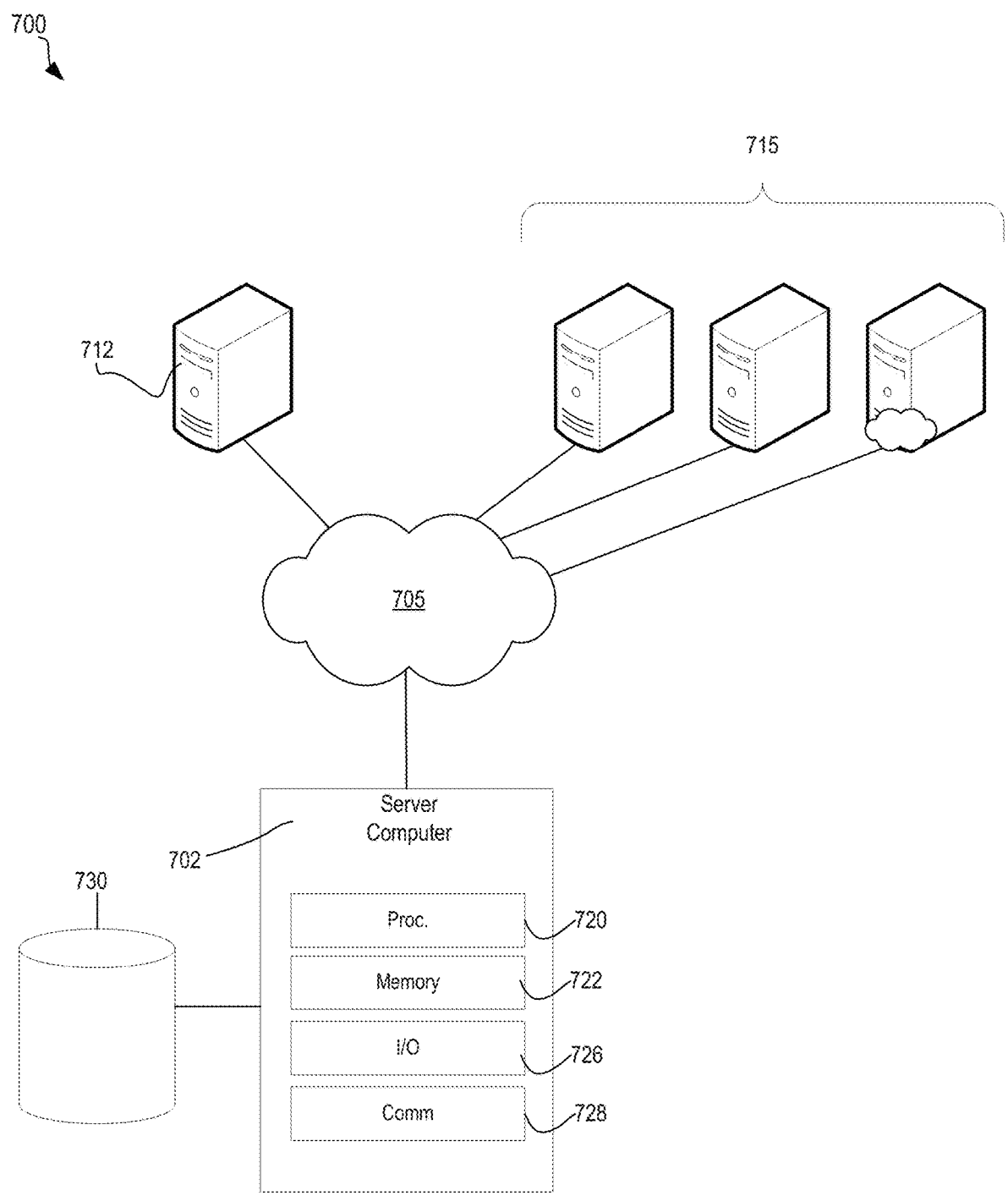
FIG. 7 is a diagrammatic representation of one embodiment of a distributed computing environment.

FIG. 7 depicts a diagrammatic representation of a distributed network computing environment where embodiments disclosed herein can be implemented. In the example illustrated, network computing environment 700 includes network 705 that can be bi-directionally coupled to a client computer 712, a server computer 702 and archive storage systems 715. Network 705 may represent a combination of wired and wireless networks that network computing environment 700 may utilize for various types of network communications known to those skilled in the art. For the purpose of illustration, a single system is shown for each of computer 702 and 712. However, each of computers 702 and 712 may comprise a plurality of computers (not shown) interconnected to each other over network 705. Archive storage systems 715 may represent a variety of archive storage systems including, but not limited to, cloud based archival systems.

Server computer 702 can include a processor 720 and associated memory 722. Computer processor 720 may be an integrated circuit for processing instructions, such as, but not limited to a central processing unit (CPU). Memory 722 may include volatile memory, non-volatile memory, semi-volatile memory or a combination thereof. Memory 722, for example, may include RAM, ROM, flash memory, a hard disk drive, a solid-state drive, an optical storage medium (e.g., CD-ROM), or other computer readable memory or combination thereof. Memory 722 may implement a storage hierarchy that includes cache memory, primary memory or secondary memory. In some embodiments, memory 722 may include storage space on a data storage array. Server computer 702 may also include input/output ("I/O") devices 726, such as a keyboard, monitor, printer, electronic pointing device (e.g., mouse, trackball, stylus, etc.), or the like, and a communication interface 728, such as a network interface card, to interface with network 705.

According to one embodiment, server computer 702 may include computer executable instructions stored on a non-transitory computer readable medium coupled to a processor. The computer executable instructions of server computer 702 may be executable to provide an archive server or implement an ingest or search path for records in indexed data packages stored at archive storage system 715. A portion of memory 722 may act as a package data store (e.g., a package data store 112, a package data store 316) to cache package data. In another embodiment, the package data store may be provided by, for example, a network filesystem or other network connected storage. One or more services provided by server computer 702 may use a database 730 (e.g., as provided by a RDBMS). Database 730 may be a portion of memory 722 or may be provided over a network by a database node.

Portions of the methods described herein may be implemented in suitable software code that may reside within RAM, ROM, a hard drive or other non-transitory storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method for searching indexed packages, comprising:
    ingesting records of data, the records of data ingested in packages, the ingesting comprising:
        indexing the records of data based on a parameter, the indexing including storing an index file in each of the packages, the index file in each of the packages indexing records of data in that package using the parameter, wherein the parameter is characterized by a range of values;
        generating indexed packages for the records of data based on the parameter, wherein each of the generated indexed packages corresponds to one of a plurality of subsets of the range of values;
        generating metadata for the indexed packages, the metadata for each indexed package comprising a reference to that indexed package of records and a package key that characterizes that indexed package of records based on a value of the parameter, wherein the package key differs from the parameter; and
        storing the indexed packages in a data repository;
    querying the records of data based on a query defining a search value of the parameter, the querying comprising:
        searching the metadata based on the search value of the parameter, wherein the search value is defined within one of the subsets;
        identifying a package key for the metadata referencing the search value of the parameter;
        loading, from a file-based cache, an indexed package based on the identified package key, when the indexed package is stored in the cache; and
        loading, from the data repository which is an archive storage, the indexed package when the indexed package is not stored in the cache.

2. The method of claim 1, wherein the parameter is characterized by a plurality of categories and wherein each of the generated indexed packages corresponds to one of the categories and the search value corresponds to one of the categories.

3. The method of claim 1, wherein the metadata is stored in a relational database.

4. The method of claim 1, wherein the cache is memory which permits loading of the indexed packages and the records of data therewithin faster than the archive storage.

5. The method of claim 4, wherein the indexed packages are loaded synchronously from the cache and asynchronously from the archive storage.

6. The method of claim 4, wherein the archive storage permits data replication.

7. A system for searching indexed packages, comprising:
    a processor;
    memory coupled to the processor, the memory comprising computer executable instructions that, when executed by the processor, perform a method for searching indexed packages; comprising:
    ingesting records of data, the records of data ingested in packages, the ingesting comprising:
        indexing the records of data based on a parameter, the indexing including storing an index file in each of the packages, the index file in each of the packages indexing records of data in that package using the parameter, wherein the parameter is characterized by a range of values;
        generating indexed packages for the records of data based on the parameter, wherein each of the generated indexed packages corresponds to one of a plurality of subsets of the range of values;
        generating metadata for the indexed packages, the metadata for each indexed package comprising a reference to that indexed package of records and a package key that characterizes that indexed package of records based on a value of the parameter, wherein the package key differs from the parameter; and
        storing the indexed packages in a data repository;
    querying the records of data based on a query defining a search value of the parameter, the querying comprising:

searching the metadata based on the search value of the parameter, wherein the search value is defined within one of the subsets;

identifying a package key for the metadata referencing the search value of the parameter;

loading, from a file-based cache, an indexed package based on the identified package key, when the indexed package is stored in the cache; and loading, from the data repository which is an archive storage, the indexed package when the indexed package is not stored in the cache.

8. The system of claim 7, wherein the parameter is characterized by a plurality of categories and wherein each of the generated indexed packages corresponds to one of the categories and the search value corresponds to one of the categories.

9. The system of claim 7, wherein the metadata is stored in a relational database.

10. The system of claim 7, wherein the cache is memory which permits loading of the indexed packages and the records of data therewithin faster than the archive storage.

11. The system of claim 10, wherein the indexed packages are loaded synchronously from the cache and asynchronously from the archive storage.

12. The system of claim 10, wherein the archive storage permits data replication.

13. A computer program product comprising a non-transitory computer readable medium storing instructions executable by a processor to search indexed packages in a computing environment, the set of operations comprising:

ingesting records of data, the records of data ingested in packages, the ingesting comprising:

indexing the records of data based on a parameter, the indexing including storing an index file in each of the packages, the index file in each of the packages indexing records of data in that package using the parameter, wherein the parameter is characterized by a range of values;

generating indexed packages for the records of data based on the parameter, wherein each of the generated indexed packages corresponds to one of a plurality of subsets of the range of values;

generating metadata for the indexed packages, the metadata for each indexed package comprising a reference to that indexed package of records and a package key that characterizes that indexed package of records based on a value of the parameter, wherein the package key differs from the parameter; and storing the indexed packages in a data repository;

querying the records of data based on a query defining a search value of the parameter, the querying comprising:

searching the metadata based on the search value of the parameter, wherein the search value is defined within one of the subsets;

identifying a package key for the metadata referencing the search value of the parameter;

loading, from a file-based cache, an indexed package based on the identified package key, when the indexed package is stored in the cache; and loading, from the data repository which is an archive storage, the indexed package when the indexed package is not stored in the cache.

14. The computer program product of claim 13, wherein the parameter is characterized by a plurality of categories and wherein each of the generated indexed packages corresponds to one of the categories and the search value corresponds to one of the categories.

15. The computer program product of claim 13, wherein the metadata is stored in a relational database and the archive storage permits data replication.

16. The computer program product of claim 13, wherein the cache is memory which permits loading of the indexed packages and the records of data therewithin faster than the archive storage.

17. The computer program product of claim 16, wherein the indexed packages are loaded synchronously from the cache and asynchronously from the archive storage.

* * * * *